United States Patent
Totzke

(10) Patent No.: US 7,411,976 B2
(45) Date of Patent: Aug. 12, 2008

(54) METHOD AND GATEWAY DEVICE FOR CONVERTING A FEATURE CONTROL SIGNALING WHEN CHANGING BETWEEN DIFFERENT COMMUNICATIONS NETWORKS

(75) Inventor: Jürgen Totzke, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 1232 days.

(21) Appl. No.: 10/381,807

(22) PCT Filed: Sep. 11, 2001

(86) PCT No.: PCT/DE01/03491

§ 371 (c)(1),
(2), (4) Date: Mar. 31, 2003

(87) PCT Pub. No.: WO02/28112

PCT Pub. Date: Apr. 4, 2002

(65) Prior Publication Data

US 2003/0185234 A1    Oct. 2, 2003

(30) Foreign Application Priority Data

Sep. 29, 2000 (DE) .............................. 100 48 484

(51) Int. Cl.
*H04L 12/66*  (2006.01)
(52) U.S. Cl. .................. 370/467; 370/401; 370/355; 370/356

(58) Field of Classification Search ............... 370/467, 370/466, 401, 352, 353, 354, 355, 356, 253
See application file for complete search history.

(56) References Cited

U.S. PATENT DOCUMENTS

| | | | |
|---|---|---|---|
| 6,950,441 B1* | 9/2005 | Kaczmarczyk et al. | 370/467 |
| 6,967,956 B1* | 11/2005 | Tinsley et al. | 370/466 |
| 7,002,989 B2* | 2/2006 | Agrawal et al. | 370/467 |
| 2003/0012183 A1* | 1/2003 | Butler et al. | 370/352 |

FOREIGN PATENT DOCUMENTS

| | | | |
|---|---|---|---|
| AU | 199961743 | * | 6/2000 |
| EP | 1 005 239 A2 | | 5/2000 |
| EP | 1 093 313 A2 | | 4/2001 |
| WO | WO 97/16007 | | 5/1997 |
| WO | WO 99/05590 | | 2/1999 |
| WO | WO 00/39960 | | 7/2000 |

* cited by examiner

*Primary Examiner*—Min Jung
(74) *Attorney, Agent, or Firm*—Staas & Halsey LLP

(57) ABSTRACT

In the framework of a conversion of a feature control signaling, an item of feature control information is extracted from a protocol-specific feature control message of a communication network and is transmitted to a feature-neutral coordination module. The coordination module then relays the item of feature control information to a feature-specific conversion module, which converts the relayed item of feature control information into an item of feature control information, which is subsequently inserted into another protocol-specific feature control message and is transmitted therewith into another communication network.

18 Claims, 1 Drawing Sheet

METHOD AND GATEWAY DEVICE FOR CONVERTING A FEATURE CONTROL SIGNALING WHEN CHANGING BETWEEN DIFFERENT COMMUNICATIONS NETWORKS

CROSS REFERENCE TO RELATED APPLICATIONS

This application is based on and hereby claims priority to PCT Application No. PCT/DE01/03491 filed on 11 Sep. 2001 and German Patent Application No. 100 48 484.0 filed on 29 Sep. 2000, the contents of which are hereby incorporated by reference.

BACKGROUND OF THE INVENTION

In contemporary communications systems, connections, e.g. for voice, video, multimedia and/or data communication, which are traditionally routed via circuit-switched communications networks, are to an increasing extent also being switched via packet-switched communications networks, such as e.g. so-called local area networks (LANs) or the Internet. For example, Internet telephony, frequently also referred to as "Voice over Internet Protocol" (VoIP), is based on this technology.

At the point of transition of a connection between a circuit-switched and a packet-switched communications network, it is usually necessary, owing to the differing transmission and signaling protocols, to convert control signaling information provided for connection control. As well as an implementation of cross-network setup and cleardown of connections, the principal problem that poses itself here is also to ensure cross-network control and interworking of service features in the communications system.

SUMMARY OF THE INVENTION

According to an aspect of the present invention, there is provided a method and a gateway device for converting service feature control signaling information at the point of transition between communications networks using different signaling protocols.

According to an aspect, the present invention permits service feature control signaling information for controlling service features such as e.g. call forwarding—all calls, conferencing, call forwarding—no answer, callback, etc., to be efficiently converted at the point of transition (gateway) between communications networks using different signaling protocols. Toward that end, an item of service feature control information is extracted from a service feature control message of a communications network, the message being specific to the respective signaling protocol of the communications network in question, and transmitted to a service feature-neutral coordination module. The service feature-neutral coordination module assigns the transmitted service feature control information to a service feature-specific conversion module, i.e. a module specifically responsible for a particular service feature, and relays the service feature control information to this conversion module. The assigned conversion module then converts the relayed service feature control information into service feature control information that is specific to another of the communications networks. The converted service feature control information is then inserted into a further protocol-specific service feature control message and transmitted with this into the other communications network.

Because the service feature-specific conversion module is logically separated from the service feature-neutral coordination module and from the protocol-specific access modules, the functionality of a gateway device according to the invention can be extended in a very simple way. Thus, for example, processing of an additional service feature can be implemented simply by adding a further conversion module specific to this additional service feature. Furthermore, the gateway device can be adapted to different signaling protocols by modification, replacement or addition of a protocol-specific access module. Such extensibility achievable by adding function modules is frequently also referred to as "plug & play" capability.

According to an aspect of the present invention, there is provided service feature control information between the access modules, the coordination module and a conversion module can be transferred by asynchronous messages. Such an asynchronous information exchange reduces the dependencies between the individual function modules, resulting in a considerable improvement in the extensibility and maintainability of the gateway device.

According to an aspect of the present invention, there is provided a service feature-specific conversion module can register with the coordination module by transmitting an item of service feature information. At the same time the service feature information can specify which service feature control information is to be assigned to the conversion module concerned. The service feature information can preferably comprise a service feature code identifying the particular service feature and the particular conversion device as well as a set of operation codes. Here, each of the operation codes identifies a service feature control operation from the set of control operations provided for controlling the respective service feature. Each of the operation codes can preferably be assigned to at least one conversion module in an assignment table of the coordination module. A conversion module can be registered for example at system start, at the time that the respective conversion module is generated as an instance of a programmed object class and/or at the time that a service feature assigned to the respective conversion module is requested. By an assignment table of this type, service feature control information can be assigned to the respective conversion module responsible on the basis of operation codes contained in the table by simple table access.

The coordination module also enables status information about the status of a connection to be assigned to at least one conversion module and to be relayed to this module. In this way the conversion of the service feature control information can be performed as a function of the status of a connection to which the respective service feature is assigned.

Furthermore, according to an aspect of the present invention, a connection can also be controlled as a function of an item of service feature control information or status information transmitted in the course of a connection by a service feature-specific conversion module. To this end, connection control information generated by the conversion module can be relayed by the coordination module to an access module, which forwards the connection control information to a connection controller.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
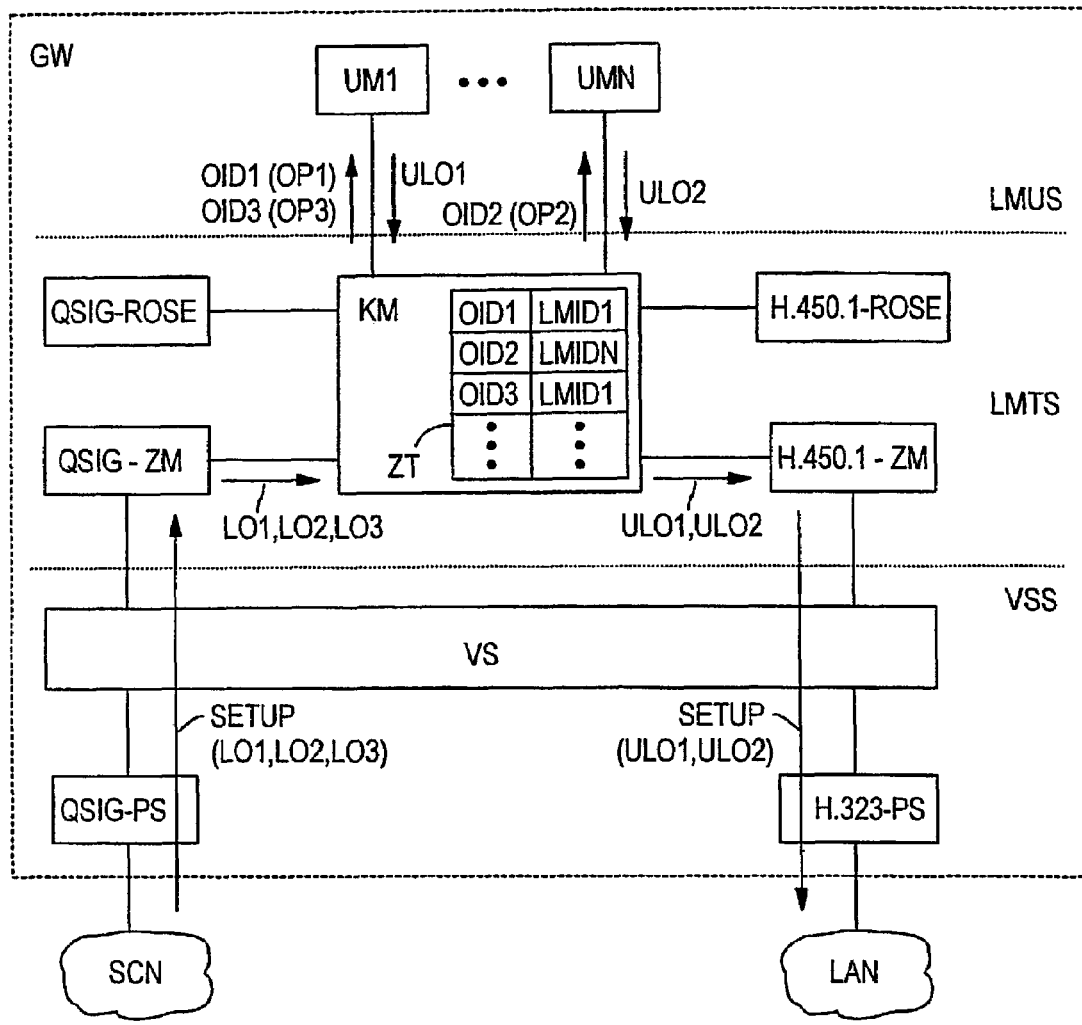
FIG. 1 shows a gateway device interposed between a circuit-switched and a packet-switched communications network.

Reference will now be made in detail to the preferred embodiments of the present invention, examples of which are illustrated in the accompanying drawings, wherein like reference numerals refer to like elements throughout.

FIG. 1 shows a schematic representation of a gateway device GW according to the invention, the gateway device being interposed as a switching element between a circuit-switched communications network SCN (Switched Circuit Network) and a packet-switched communications network LAN implemented as a local area network (LAN). For the present example embodiment it is assumed that the QSIG protocol stack conforming to the ETSI/ECMA standard for signaling at the Q reference point is provided for connection signaling in the circuit-switched communications network SCN. In order to control service features, service feature control signaling based on the QSIG-GFT protocol (QSIG Generic Functional Transport) is also supported in the circuit-switched communications network SCN. In the local area network LAN, connection signaling is performed according to ITU-T recommendation H.323, with service features being controlled according to ITU-T recommendations H.450 and H.450.1.

As functional components, the gateway device GW comprises a connection controller VS, a protocol controller QSIG-PS for the QSIG protocol stack, a protocol controller H.323-PS for H.323 signaling, a protocol-specific, service feature-neutral access module QSIG-ZM for accessing the QSIG-GFT signaling, a protocol-specific, service feature-neutral access module H.450.1-ZM for accessing the H.450.1 signaling framework, a central, service feature- and protocol-neutral coordination module KM, as well as multiple conversion modules UM1, . . . , UMN. Each of the conversion modules UM1, . . . , UMN is specifically responsible for one of several different service features, such as e.g. call forwarding—all calls, conferencing, call forwarding—no answer, etc.

The connection controller VS is linked to the circuit-switched communications network via the protocol controller QSIG-PS and to the local area network LAN via the protocol controller H.323-PS. The connection controller VS is further linked to the coordination module KM on the one hand via the access module QSIG-ZM and on the other hand via the access module H.450.1-ZM. Also linked to the coordination module KM are the service feature-specific conversion modules UM1, . . . , UMN as well as a control module QSIG-ROSE specifically provided for the QSIG protocol and a control module H.450.1-ROSE (ROSE: Remote Operation Service Entity) specifically provided for the H.450.1 protocol.

The functional components of the gateway device GW are separated into different logical layers, namely a connection controller layer VSS, a service feature transport layer LMTS and a service feature conversion layer LMUS. The boundaries between these logical layers are indicated by dotted lines in FIG. 1. The connection controller VS as well as the protocol controllers QSIG-PS and H.323-PS are assigned here to the connection controller layer VSS. The coordination module KM, the control modules QSIG-ROSE and H.450.1-ROSE as well as the access modules QSIG-ZM and H.450.1-ZM are further associated with the service feature transport layer LMTS. The access modules QSIG-ZM and H.450.1-ZM act among other things as a logical link and synchronization device between the connection signaling and the service feature signaling. The control modules QSIG-ROSE and H.450.1-ROSE serve to monitor the transactions initiated by the service feature control messages in the service feature transport layer LMTS. Finally, the conversion modules UM1, . . . , UMN are assigned to the service feature conversion layer LMUS. Owing to the separation of the functional components into individual logical layers, the functionality of the gateway device GW can be extended in a very simple manner. For example, the processing of an additional service feature can be implemented simply by adding an additional conversion module specific to this service feature. Furthermore, the gateway device GW can be adapted to different signaling protocols in the connected communication networks by modification, replacement or addition of a protocol-specific access module. The modular layer architecture further supports an interaction between the service features in a generic manner.

The central coordination module KM, the access modules QSIG-ZM and H.450.1-ZM, the control modules QSIG-ROSE and H.450.1-ROSE, and the conversion modules UM1, . . . , UMN are in each case preferably implemented as an instance of a programmed object class. An information exchange between the instances takes place by asynchronous messages. While the coordination module KM is preferably initialized as a class instance at system start time, the remaining class instances are preferably initialized the first time a service feature control message is received by the connection controller VS.

During the initialization of the conversion modules UM1, . . . , UMN, these register themselves with the coordination module KM. In the course of the registration of a conversion module UM1, . . . , UMN, this transmits a registration message (not shown) to the coordination module KM. The registration message preferably contains a service feature code LMIDI, . . . , LMIDN which identifies the corresponding conversion module or the service feature to be processed by this module, as well as a set of operation codes OIDI,OID2,OID3, . . . , by which those service feature control operations are identified which are provided for controlling the corresponding service feature. The set of operation codes and the service feature code of a registration message are stored assigned to each other in an assignment table ZT of the coordination module KM. For the present example embodiment it is assumed that the conversion module UM1 with the service feature code LMID1 and the operation codes OID1, OID3 and the conversion module UMN with the service feature code LMIDN and the operation code OID2 are registered in the assignment table ZT.

In the following, consideration is given to conversion of a service feature control signaling information of the circuit-switched communications network SCN into functionally equivalent service feature control signaling information for the local area network LAN. The chosen direction of the conversion should be understood here only as an example. Accordingly, the following statements apply analogously also for a conversion in the opposite direction.

In the present example embodiment, a QSIG connection setup message SETUP is transmitted in the course of the service feature control signaling as a protocol-specific service feature control message to the gateway device GW by the circuit-switched communications network SCN.

Figure 2:
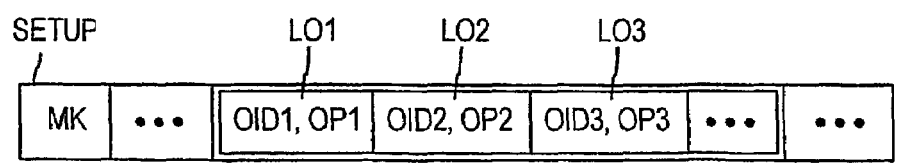
FIG. 2 shows a connection setup message containing an item of service feature control information.

As shown schematically in FIG. 2, the connection setup message SETUP contains—apart from its message header MK—a generic data container for accepting signaling elements that are formed in the present example embodiment by protocol-specific coded service feature control information LO1, LO2, LO3, . . . . Each service feature control information LO1,LO2,LO3, . . . is composed of an operation code OIDI,OID2,OID3, . . . identifying a service feature control operation and an associated set of operation parameters OP1, OP2,OP3, . . . .

Other QSIG signaling messages that possess a generic data container can also be used as service feature control messages instead of the connection setup message SETUP.

The connection setup message SETUP received by the gateway device GW is forwarded by the protocol controller QSIG-PS to the connection controller VS and recognized by this as a service feature control message. As a result, the connection controller VS initiates an initialization of the access modules QSIG-ZM and H.450.1-ZM, the control modules QSIG-ROSE and H.450.1-ROSE, as well as the conversion modules UM1, . . . , UMN as instances of programmed object classes.

The protocol-specific access module QSIG-ZM then extracts the service feature control information LO1, LO2 and LO3 from the protocol-specific connection setup message SETUP and decodes this into a protocol-neutral format. The decoded service feature control information LO1, LO2 and LO3 is then transferred separately within asynchronous messages to the coordination module KM. A connection code (not shown) identifying the connection to be set up is also transmitted to the coordination module KM, the service feature control information LO1, LO2 and LO3 being assigned to the connection to be set up on the basis of the connection code.

The operation codes OID1, OID2 and OID3 contained in the service feature control information LO1, LO2 and LO3 are read out together with the respective set of operation parameters OP1, OP2 or OP3 in the coordination module KM. Next, the service feature code, in this case LMID1 or LMIDN, assigned to a respective operation code OID1, OID2 or OID3, and hence the respective conversion module responsible, in this case UM1 or UMN, is determined by accessing the assignment table ZT. Accordingly, the operation code OID1 with the operation parameters OPI and the operation code OID3 with the operation parameters OP3 are relayed to the conversion module UM1. Analogously, the operation code OID2 and the operation parameters OP2 transmitted with this operation code OID2 are relayed to the conversion module UMN. In the conversion module UM1, the service feature control operation with the operation parameters OP1 identified by the operation code OID1 and the service feature control operation with the operation parameters OP3 identified by the operation code OID3 are then converted into one or more functionally equivalent items of service feature control information ULO1 for the local area network LAN. In the same way, the service feature control operation identified by the operation code OID2 is converted together with its operation parameters OP2 into one or more functionally equivalent items of service feature control information ULO2 for the local area network in the conversion module UMN.

The converted service feature control information ULOI and ULO2 is transferred to the coordination module KM by asynchronous messages. The service feature control information ULO1 and ULO2 of the connection identified by the connection code is assigned by the coordination module KM and thus relayed to the access module H.450.1-ZM. The access module H.450.1-ZM then codes the converted service feature control information ULO1 and ULO2 into a H.450.1-specific format. In this format, the converted service feature control information ULO1 and ULO2 is inserted into a connection setup message SETUP specific to the local area network LAN, the connection setup message finally being transmitted via the protocol controller H.323-PS into the local area network LAN by the connection controller VS.

The invention has been described in detail with particular reference to preferred embodiments thereof and examples, but it will be understood that variations and modifications can be effected within the spirit and scope of the invention.

The invention claimed is:

1. A method of converting service feature control signaling information at a point of transition between first and second communications networks using different signaling protocols, comprising:
   extracting service feature control information from a protocol-specific service feature control message of the first communications network using a protocol-specific access module;
   transmitting the extracted service feature control information to a service feature-neutral coordination module;
   assigning the extracted service feature control information using the service feature-neutral coordination module to at least one service feature-specific conversion module;
   relaying the extracted service feature control information to the at least one conversion module;
   converting the relayed service feature control information using the at least one conversion module into service feature control information specific to the second communications network; and
   inserting the service feature control information specific to the second communications network using a further protocol-specific access module into a further protocol-specific service feature control message which is transmitted into the second communications network.

2. The method according to claim 1, wherein the relayed service feature control information and the service feature control information specific to the second communications network are transferred between the access modules, the coordination module and the at least one conversion module by asynchronous messages.

3. The method according to claim 2, wherein the at least one conversion module registers with the coordination module by transmitting, to the coordination module, service feature information that specifies which of the converted relayed service feature control information is to be assigned to the conversion module.

4. The method according to claim 3, wherein status information about a status of a connection is assigned by the coordination module to the at least one conversion module and is relayed to the at least one conversion module.

5. The method according to claim 4, wherein connection control information to control a connection is formed by the at least one conversion module as a function of the converted relayed service feature control information relating to the connection and/or status information of the connection and relayed by the coordination module to an access module.

6. The method according to claim 1, wherein the at least one conversion module registers with the coordination module by transmitting, to the coordination module, service feature information that specifies which of the converted relayed service feature control information is to be assigned to the conversion module.

7. The method according to claim 1, wherein status information about a status of a connection is assigned by the coordination module to the at least one conversion module and is relayed to the at least one conversion module.

8. The method according to claim 1, wherein connection control information to control a connection is formed by the at least one conversion module as a function of the converted relayed service feature control information relating to the connection and/or status information of the connection and relayed by the coordination module to an access module.

9. A gateway device to convert service feature control signaling information at a point of transition between first and second communication networks using different signaling protocols, comprising:
first and second protocol-specific access modules corresponding to the first and second communication networks, respectively, extracting and inserting first and second service feature control information out of and into protocol-specific service feature control messages of the corresponding first and second communication networks;
a service feature-specific conversion module converting one of the first and second service feature control information extracted from one of the corresponding first or second communication network into the other of the first and second service feature control information specific to the other of the first and second communication network; and
a service feature-neutral coordination module assigning an extracted item from the one of the first and second service feature control information to the service feature-specific conversion module, and transmitting the item of the one of the first and second service feature control information between the service feature-specific conversion module and the corresponding first and second protocol-specific access modules.

10. The gateway device according to claim 9, wherein the protocol specific access module comprises:
a first access module accessing the first communication network comprising a circuit-switched communication network; and
a second access module accessing the second communication network comprising a packet-switched communication network, and the conversion module converts between the first and second service feature control information comprising packet-oriented and circuit-oriented service feature control information, respectively.

11. The gateway device according to claim 10, wherein the coordination module comprises an assignment table in which operation codes contained in the first service feature control information, each code identifying a service feature control operation assigned to the at least one of the service feature-specific conversion modules.

12. The gateway device according to claim 11, wherein the coordination module is an instance of a programmed object class.

13. The gateway device according to claim 12, wherein the first and second access modules and/or the conversion modules are each an instance of a programmed object class.

14. The gateway device according to claim 13, wherein the first and second access modules are generated as instances as soon as the protocol-specific service feature control message is received during a connection.

15. The gateway device according to claim 9, wherein the coordination module comprises an assignment table in which operation codes contained in the first service feature control information and each identifying a service feature control operation assigned to the at least one of the service feature-specific conversion modules.

16. The gateway device according to claim 9, wherein the coordination module is an instance of a programmed object class.

17. The gateway device according to claim 9, wherein the first and second access modules and/or the conversion modules are each an instance of a programmed object class.

18. The gateway device according to claim 17, wherein the first and second access modules are generated as instances as soon as the protocol-specific service feature control message is received during a connection.

\* \* \* \* \*